US005888657A

United States Patent [19]

Tavernier et al.

[11] Patent Number: 5,888,657

[45] **Date of Patent: *Mar. 30, 1999**

[54] IMAGE RECEPTOR SHEET OR WEB MATERIAL CARRYING A LAYER WITH A POLYSILOXANE MODIFIED POLYMER

[75] Inventors: Serge Tavernier, Lint; August Marien, Westerlo; Werner Op de Beeck, Keerbergen, all of Belgium

[73] Assignee: AGFA-Gevaert, N.V., Mortsel, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 786,022

[22] Filed: Jan. 21, 1997

Related U.S. Application Data

[62] Division of Ser. No. 617,327, Mar. 18, 1996, Pat. No. 5,620,825.

[30] Foreign Application Priority Data

Mar. 23, 1995 [EP] European Pat. Off. .............. 95200723

[51] Int. Cl.$^6$ ................................ B32B 9/04; B32B 5/16; B32B 3/00; C08F 283/12

[52] U.S. Cl. .......................... 428/447; 428/195; 428/323; 525/100; 525/474; 525/476; 525/479

[58] Field of Search ............................... 428/355 R, 447, 428/704, 323, 195, 391, 913, 914; 525/100, 474, 476, 479

[56] References Cited

U.S. PATENT DOCUMENTS

| | | | |
|---|---|---|---|
| 4,977,229 | 12/1990 | Culberson et al. | 525/479 X |
| 5,126,400 | 6/1992 | Graiver et al. | 525/100 X |
| 5,143,951 | 9/1992 | Ohta et al. | 525/476 X |
| 5,260,133 | 11/1993 | Brandt et al. | 428/447 X |
| 5,426,151 | 6/1995 | Brandt et al. | 525/100 |
| 5,530,075 | 6/1996 | Morita et al. | 525/474 X |

*Primary Examiner*—Bernard Codd
*Attorney, Agent, or Firm*—Breiner & Breiner

[57] ABSTRACT

An image receptor sheet or web material carrying a layer with a polymeric binder on a support wherein the polymeric binder is at least 50% by weight of a polysiloxane modified resin and comprises polymeric moieties derived from polyesters or addition polymers with an acid value or hydroxy value between 2 and 50 mg KOH/g of polymer and the polysiloxane moieties are derived from epoxy-terminated polysiloxanes.

5 Claims, No Drawings

IMAGE RECEPTOR SHEET OR WEB MATERIAL CARRYING A LAYER WITH A POLYSILOXANE MODIFIED POLYMER

This is a division of application Ser. No. 08/617,327 filed Mar. 18, 1996 now U.S. Pat. No. 5,620,825.

FIELD OF THE INVENTION

The present invention relates to dry toner particles used as image forming species in electrically or magnetically based imaging methods as, e.g. electro(photo)graphy, magnetography, direct electrostatic printing (DEP), ionography, etc., wherein the toner particles comprise copolymers comprising polysiloxane moieties. The invention relates also to a simple method for preparing a distinct class of copolymers comprising polysiloxane moieties. The invention further relates to protective layers comprising such copolymers.

BACKGROUND OF THE INVENTION

Copolymers comprising polysiloxane moieties are known to possess desirable properties. Coatings of such copolymers are very adhesive and water repellent, while remaining fairly scratch resistant. The copolymers do also possess desirable slip and anti-sticking properties.

In, e.g., EP-A 118 387 and EP-A 188 388 polyesters, modified with polysiloxane moieties and having good slip properties, are disclosed. The polysiloxane moieties are polysiloxane-polyethers and are di-hydroxy-terminated. The incorporation of the polysiloxane moieties in the polyester proceeds by polycondensation of the polysiloxane diol together with di-carboxylic acids and other diols.

In, e.g., EP-A 380 224, a thermal transfer donor element is disclosed, comprising an anti-sticking backing layer, wherein an organopolysiloxane-polyurea is incorporated. These copolymers are prepared by the reaction of a silicone diamine, a di-isocyanate and a diamine or dihydroxy chain extender.

The use of copolymers comprising polysiloxane moieties in toner particles used as image forming species in electrically or magnetically based imaging methods is also known. Said copolymers are mainly used to overcome adhesion problems typical for toner particles. The adhesion of toner particles to each other, diminishing fluidity of the toner and diminishing resolution in the final image is one of the problems addressed by using copolymers comprising polysiloxane moieties. An other problem addressed by the use of said copolymers, is, in a multi-component developer, the adhesion of toner particles to carrier particles. Also the problem of "hot-offset" in imaging methods using a heated fixing roller can be overcome by using the copolymers described above.

In DE-OS 22 53 402 it is disclosed to use a block copolymer comprising a hard block and a weak block to overcome problems with hot-offset. The choice of the preferred hard and weak blocks depends more on the elasticity modulus and/or tensile strength than by the chemical nature of the hard and weak blocks. A copolymer comprising poly(bisphenol A-carbonate) as hard block and polydimethylsiloxane as weak block is disclosed.

In U.S. Pat. No. 5,089,547 the use of low surface adhesion (LSA) additives in toner composition is disclosed. The LSA are cross-linked and formed by the reaction of an amino-terminated polysiloxane, a polyester and a novolac resin carrying epoxy groups. Di-functional secondary amine terminated polysiloxanes are preferred.

In EP-A 298 279 it is disclosed that toner particles, comprising a mixture of polyester resin and a polyester resin comprising polysiloxane chains (cross-linked or not) as toner resin, are very well suited for use in imaging systems using a hot roller fusing step. It is also stated, in e.g. EP-A 298 279, that the quality of the blending of both resins, during the toner preparation, influences the quality of the toner particles and the amount of polysiloxane modified polyester needed in the toner particles. In EP-A 298 279 the preparation of a random graft polymer of a multifunctional organosiloxane polymer, namely α, ω, δ-aminopropyl poly (dimethyl-co-methoxy-δ-aminopropyl siloxane) and a polyester is described. The reaction proceeds at 220° C. for 2 hours followed by another hour reaction at 240° C. and under reduced pressure. The incorporation of polysiloxane moieties in polyesters over an amino group, is not so desirable for polysiloxane modified resins used as toner resin, since polyester tend to be negatively charged by tribo-electric contact and the aminogroups diminish the negative chargeability of the polysiloxane modified resin.

Addition polymers comprising polysiloxane moieties are described in, e.g., EP-A 300 426, EP-A 361 522, EP-A 413 604 and EP-A 441 276. In EP-A 300 426 the preparation of addition polymers of unsaturated polysiloxanes and α, β ethylenically unsaturated monomers is described. This reaction gives rise to graft-polymers where the polysiloxane moieties are contained in side chains. The product is used as lubricant in electrophotographic photosensitive members. In EP-A 361 522 it is disclosed to produce a macromonomer by introducing a vinyl silane in a terminal diol-type polydimethylsiloxane and radical polymerizing said macromonomer with, e.g. vinylacetate or other α, β ethylenically unsaturated monomers.

In EP-A 581 150 it is disclosed to form a releasing agent for blending in to toner particles by reacting an organic polysiloxane having an hydroxyl group or an epoxy group with an ethylenically unsaturated dicarboxylic acid grafted polyolefin or with a reaction product of said grafted polyolefin and an active hydrogen atom containing compound selected from the group consisting of an alcohol, an amine and an aminoalcohol. The polyolefin used in the reaction is preferably a low molecular weight polyolefin. This release agent is basically a crystalline polymer and by mixing this releasing agent with toner resins, the toner resin/releasing agent system shows incompatibilities, since the releasing agents in this disclosure are very apolar and since, due to the crystallinity of this releasing agent, the interfacial adhesion to the toner resin is very low. When using such a toner resin/releasing agent system in a process for toner preparation wherein the toner particles are prepared by a pulverizing process, the releasing agent tends to break out of the mixture, thus forming free particles of releasing agent during the pulverizing step. This free particles of releasing agent can not easily be controlled and are inevitably introduced together with the toner particles in the developer, thus inducing unstable behaviour of the developer.

There is thus still a need, to enhance the releasing properties of toner particles for a polysiloxane modified resin that could be incorporated in toner resin in higher amounts than previously disclosed and thus further enhancing the releasing properties of toner particles, without however negatively influencing the physical properties of the toner particles and showing a better compatibility and interaction with commonly used toner resins.

Most preparation methods for polysiloxane modified resins are adapted for the formation of either modified polycondensation copolymers or modified addition copolymers.

A single method that makes it possible to form both modified polycondensation copolymers or modified addition copolymers, has not been found.

The reactions often proceed in organic solvents, which have to be recuperated for complying with environmental legislation, or when the reactions proceed in the melt, the preparation of copolymers comprising polysiloxane moieties are mostly conducted at high temperature and there is a risk of degradation of the polysiloxane moiety.

There is also thus still need for an easy, fast, reproducible and solvent free preparation method, that is applicable both for forming polysiloxane modified polycondensation copolymers and addition copolymers.

OBJECTS AND SUMMARY OF THE INVENTION

It is an object of the invention to provide toner particles, both colourless and pigmented or dyed, that combine a low melting temperature with a high mechanical strength at room temperature and with very good hot-offset resistance.

It is another object of the invention to provide a resin that, when incorporated in toner particles, makes it possible to produce toner particles, both colourless and pigmented or dyed, that combine a low melting temperature with a high mechanical strength at room temperature and with very good hot-offset resistance.

It is a further object of the invention to formulate an amorphous copolymer comprising polysiloxane moieties that can be produced by a simple reaction and still have the desirable properties of known copolymers comprising polysiloxane moieties.

It is an other object of the invention to provide a single method for modifying both amorphous addition and amorphous polycondensation polymers by incorporation of polysiloxane moieties.

It is a further object of the invention to provide a copolymer comprising polysiloxane moieties that can be applied as a protective, water repellent layer.

Other objects and advantages of the invention will become clear from the detailed description hereinafter.

The objects of the invention are realized by providing dry toner particles comprising a toner resin and optionally a pigment, characterised in that said toner resin comprises more than 3% by weight with respect to the total resin content of a polysiloxane modified resin comprising polysiloxane moieties (PS) and other polymeric moieties (POL), wherein (i) said modified resin comprises recurring units corresponding to one of general formulas I to IV:

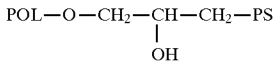 I

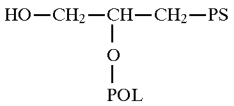 II

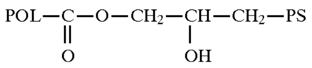 III

-continued

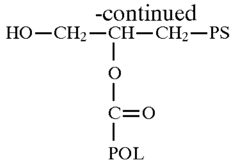 IV (ii) said other polymeric moieties (POL) are derived from polymers comprising oxygen containing groups.

In a preferred embodiment said other polymeric moieties (POL) are derived from polymers having a Tg>40° C.

In a further preferred embodiment said toner resin comprises more than 50% by weight, with respect to the total resin content, of said polysiloxane modified resin.

In a still further preferred embodiment, said toner resin consists of one or more of said polysiloxane modified resins.

DETAILED DESCRIPTION OF THE INVENTION

The need for providing toner particles with good offset resistance is widespread in the art, and has also been addressed by introducing polymeric releasing agents comprising siloxane moieties in the toner particles. Examples of such toner particles can be found in the above referenced disclosures DE-OS 22 53 402, U.S. Pat. No. 5,089,547, EP-A 298 279 and EP-A 581 150. The toner particles described in these disclosure do comprise a low amount of the releasing agent (resulting in less than optimal adhesive properties of the particles), or the releasing agent influences the physical properties, e.g., Tg (glass transition temperature), Tm (melting temperature), melt viscosity, etc., of the toner particles (limiting the usefulness of the particles to specific uses). The releasing agents, described in the references cited above, can not easily and permanently be incorporated in toner particles. The reason therefore seems to be the high crystallinity of the releasing agents and the low compatibility with commonly used toner resins.

Toner particles

It has been found that, when using polysiloxane modified resins comprising polysiloxane moieties (PS) and other polymeric moieties (POL), wherein said modified resin comprises recurring units corresponding to one of general formulas I to IV:

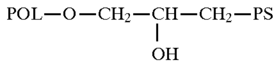 I

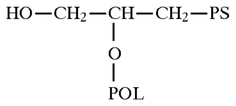 II

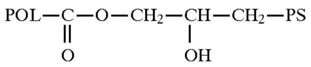 III

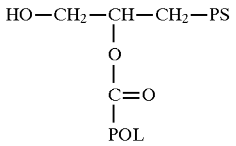 IV it was possible to introduce higher amounts of one or more of said modified copolymers in the toner particles, than previously disclosed, without adverse effects. This made it possible to produce toner particles with high mechanical strength at room temperature and with very good hot-offset resistance, especially when the moieties (POL) were derived from polymers (both polycondensation polymers and addition polymers) comprising oxygen containing groups. Polymers comprising oxygen containing groups are polymers that comprise oxygen containing groups either in the main chain or attached to the main chain. As examples of polymers comprising oxygen containing groups in the main chain can be cited polyesters, polyesteramides, polyolefine comprising ether groups, etc. Examples of polymers having oxygen containing groups attached to the main chain are, e.g., addition polymers comprising moieties derived from esters of unsaturated carboxylic acid (e.g. esters of acrylic acid). The incorporation of the polysiloxane modified resins in toner particles poses even less problems, when the other polymeric moieties (POL) are derived from non-crystalline (amorphous) polymers having a Tg>40° C., preferably having a Tg>50° C. It was found that between 3 and 100% by weight, with respect to the total resin content of one or more polysiloxane modified resins, could be introduced in the toner particles. Although the incorporation of an amount of more than 3% by weight of said polysiloxane modified resins in toner particles already presents a good offset resistance while keeping the physical properties intact, it is preferred to introduce more than 10%, even more than 50% of said modified resins in the toner particles and even more than 80%. Since the polysiloxane modified resins, according to the present invention, comprise polymeric moieties (POL) derived from polymers having a Tg>40° C. or even>50° C., it is possible to maximize the hot-offset resistance and adhesivity of the toner particles by using one or more of said polysiloxane modified resins as toner resin. I.e. it was not necessary to mix said polysiloxane modified resins with other known toner resins (e.g. polycondensation polymers or addition polymers) to prepare toner particles with high mechanical strength at room temperature and with high adhesivity.

Polysiloxane modified resins, useful to be incorporated in toner particles according to the present invention, comprise preferably polysiloxane moieties (PS) corresponding to general formula V:

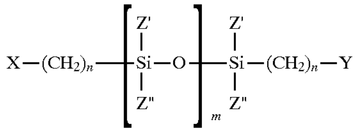

V wherein:

X corresponds to:

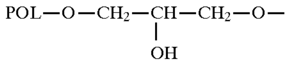

or to

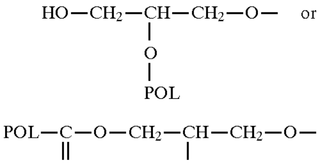

or to

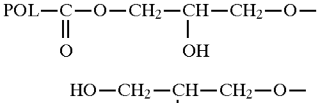

or to

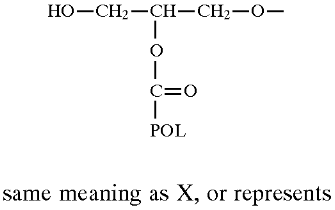

Y has the same meaning as X, or represents a lower (C1 to C4)alkyl group,

Z' and Z" are equal or different and represent a lower (C1 to C4)alkyl group or an aryl group, 2≦m≦35, and 1≦n≦6.

Preferably said polysiloxane moieties PS correspond to the formula above, with Z'=Z"=methyl or ethyl, 5≦m≦30 and 2≦n≦4. Most preferred polysiloxane moieties, according to the present invention, correspond to formula V, with Z'=Z"=$CH_3$, m=10 and n=3.

Basically the polysiloxane modified resins, for use in toner particles according to the present invention and comprising polysiloxane moieties (PS) and other polymeric moieties (POL), are prepared by a chemical reaction between carboxyl and/or hydroxyl groups comprised in the (co)polymer, giving the other polymeric moieties (POL) and epoxy groups terminating the polysiloxane, giving the polysiloxane moieties (PS).

The toner particles, according to the present invention, comprising polysiloxane modified resins can be used in electrically or magnetically based imaging methods as, e.g. electro(photo)graphy, magnetography, direct electrostatic printing (DEP), ionography, etc.

The toner particles according to the present invention, can be magnetic toner particles, toners for use in multi-component developers, in non magnetic mono- component toners etc. Toner particles, according to the present invention, comprising polysiloxane modified resins are especially useful in the production of non magnetic mono-component toner particles, due to the good adhesive properties of said resins. Although the adhesive properties of the toner particles are already high, from the incorporation of 3% by weight, with respect to the total toner resin, of polysiloxane modified polymers, on, it is preferred that in toner particles intended for non magnetic mono-component toner development, the toner resin consists of one or more polysiloxane modified resins. In such non-magnetic mono-component development, frequently lubricants (e.g. zinc stearate) or abrasives (e.g. siliciumcarbide) are added to prevent filming of the charging roller and/or charging blade and thus stabilize the charging of the toner particles. These procedures bring however-other problems, the abrasives can produce scratches and the lubricants, when not exactly dosed can enhance filming instead of avoiding it. Non magnetic toner particles for non magnetic mono component development, comprising polysiloxane modified resins, according to the present invention, can be used without the addition of said lubricants and/or abrasives.

Toner particles, comprising polysiloxane modified resins, according to the present invention, as constituent of the resinous matrix have a very high fluidity and low internal cohesion and adhesion, even without the need to use the well known measures to improve powder fluidity as e.g. the addition of known fluidity improvers (e.g. hydrophobic silica, titania, alumina, etc.).

The polysiloxane modified resins to be incorporated in toner particles, according to the present invention, comprise preferably other polymeric moieties (POL), i.e. the non-polysiloxane moieties in the polysiloxane modified resin, derived from polymers having a Tg higher than 40° C., more preferably higher than 50° C. The upper limit of the amount of polysiloxane moieties (PS) that can be introduced depends, apart from the amount of reactive sites present on the unmodified polymers, on the Tg of the unmodified polymers (the other polymeric moieties, POL) that are used to prepare the polysiloxane modified resins according to the present invention. The higher the Tg of said other polymeric moieties (POL), the more polysiloxane moieties that can be incorporated without an unacceptable reduction of the Tg of the non-polysiloxane moieties (POL) of the polysiloxane modified resins according to the present invention;

Toner particles according to the present invention, can comprise one or more polysiloxane modified resins, either alone or in combination with other resins, and can be used for dry development as well as for liquid development. The polysiloxane modified resins can (when necessary for a specific imaging technique), in toner particles according to the present invention, be mixed with other known toner resins, both polycondensation resins and addition polymerized resins e.g. unmodified polyesters, styreneacrylate polymers, etc. Toner particles, according to the present invention, can comprise any normal toner ingredient e.g. charge control agents, pigments both colored and black, inorganic fillers, etc. A description a charge control agents, pigments and other additives useful in toner particles, comprising a polysiloxane modified resin according to the present invention, can be found in e.g. EP-A 601 235. Polysiloxane modified resins, according to the present invention, are especially useful as toner resin for coloured toners.

Toner particles, according to the present invention, comprising a polysiloxane modified resin, can, when used in a multi-component dry developer, be mixed with any known carrier material. Known fluidity enhancers as e.g. hydrophobized silica, can be mixed with said toner particles. The toner particles can be used as a mono-component dry developer or mixed with carrier particles to form a multi component developer. It is possible to produce toner particles, according to the present invention, comprising a polysiloxane modified resin (macromolecule), as toner resin, by melt kneading procedures followed by milling, or by a suspension process wherein the toner resin and toner ingredients are dissolved in an organic solvent, the solution dispersed in a medium wherein said organic solvent is insoluble, and finally the organic solvent is evaporated.

Toner particles, according to the present invention, comprising a polysiloxane modified resin (macromolecule) as toner resin, can have an average volume diameter between 1 and 50 μm, preferably between 3 and 20 μm and more preferably between 3 and 10 μm. The particle size distribution of said toner particles can be of any type. It is however preferred to have a substantially Gaussian or normal particle size distribution (the normal distribution may show some skewness), either by number or volume, with a coefficient of variability (standard deviation divided by the average) (v) smaller than 0.5, more preferably of 0.3. The toner particles can have any shape, the particles can irregular, rounded, etc.

Polysiloxanes for forming the polysiloxane moieties PS

The polysiloxane modified resins, useful to be incorporated in toner particles according to the present invention, are most preferably prepared by reacting (co)polymers comprising carboxyl and/or hydroxyl groups with polysiloxane compounds carrying at least one terminal epoxide group.

The polysiloxanes, that are preferred to prepare polysiloxane modified resins, for use in toner particles according to the present invention, and for forming the polysiloxane moieties (PS) therein, can be di-functional as well as mono-functional and correspond to general formula VI

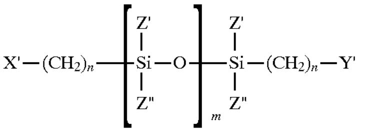

VI wherein:

X' is

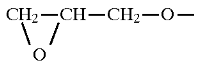

Y' has the same meaning as X', or represents a lower (C1 to C4) alkyl group,

Z' and Z", which may be the same or different, represent a lower (C1 to C4) alkyl group or an aryl group, $2 \leqq m \leqq 35$ and $1 \leqq n \leqq 6$.

In a preferred embodiment, Z' and Z" have the same significance and represent a methyl or ethyl group and $5 \leqq m \leqq 30$ and $2 \leqq n \leqq 4$. In the most preferred embodiment, the di-functional polysiloxane compounds used to prepare polysiloxane modified resins, according to the present invention, corresponds to the formula VII and the mono-functional polysiloxane compounds used to prepare polysiloxane modified resins, according to the present invention, to formula VIII.

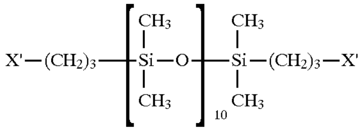

VII wherein X' is

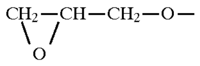

or

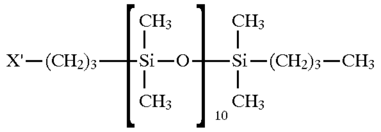

VIII wherein X' is

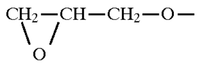

In a most preferred embodiment, a polysiloxane according to formula VI with $m \leqq 15$, especially with m=10 is used. By using such a polysiloxane, even when 15% by weight, with respect to the other polymer, of the polysiloxane is added in the reaction mixture, up to 95% is incorporated in the polysiloxane modified resin. With a polysiloxane according to formula VI, but with, e.g. m=30, even when only 5% by weight, with respect to the other polymer, of the polysiloxane is added in the reaction mixture, only 50% is incorporated in the polysiloxane modified resin. Even when the added amounts of polysiloxanes (one with m=10 and one with m=30) in the reaction mixtures were adjusted so as to have, after incorporation in the polysiloxane modified resin, the same amount of siloxane groups present, it proved, e.g., that the adhesive and anti-hot-offset properties of toner particles comprising a polysiloxane modified resin with polysiloxane moieties derived from a molecule according to formula VI and with m=10, were superior to the properties of toner particles comprising a polysiloxane modified resin with polysiloxane moieties derived from a molecule according to formula VI and with m=30.

Epoxy terminated polysiloxane derivatives, corresponding to the general formulae V to VIII, are commercially available from Th. Goldschmid AG, Essen, Germany under trade names TEGOMER E-Si 2130 AND TEGOMER E-Si 2330.

Polymers for forming the other polymeric moieties (POL)

Any polymer comprising carboxyl groups and/or hydroxyl groups can be used as polymer for the reaction with the epoxy terminated polysiloxane and for forming the other polymeric moieties (POL) in the polysiloxane modified copolymers, according to the present invention. It is preferred to use polymers (both polycondensation polymers and addition polymers) comprising oxygen containing groups. Polymers comprising oxygen containing groups are polymers that comprise oxygen containing groups either in the main chain or attached to the main chain. As examples of polymers comprising oxygen containing groups in the main chain can be cited polyesters, polyesteramides, polyolefine comprising ether groups, etc. Examples of polymers having oxygen containing groups attached to the main chain are, e.g., addition polymers comprising moieties derived from esters of unsaturated carboxylic acid (e.g. esters of acrylic acid). It is further preferred that the polymers used for forming the other polymeric moieties (POL) in polysiloxane modified resins, useful in toner particles according to the present invention, have a Tg>40° C., more preferably a Tg>50° C.

It is still further preferred that said other polymeric moieties (POL) are derived from amorphous polymers and that the final polysiloxane modified polymer is still an amorphous polymer.

The resins used to react, according to the present invention, with the epoxy groups of a polysiloxane, are more preferably (co)polyesters having a Tg>40° C., preferably having a Tg>50° C. Said (co)polyesters (hereinafter termed polyester) can be produced by any known polycondensation reaction between at least one di- or polycarboxylic acid or its lower alkyl esters and one di- or polyol. The polyester, used according to this invention can comprise aromatic dicarboxylic acid moieties. Examples of aromatic dicarboxylic acid moieties are moieties of terephthalic acid, isophathalic acid, naphthalene dicarboxylic acids, 4,4' diphenylene dicarboxylic acid, 4,4' diphenylether dicarboxylic acid, 4,4' diphenylmethane dicarboxylic acid, 4,4' diphenylsulphodicarboxylic acid, 5-sulphoisophthalic acid, etc. and mixtures of these acid moieties.

The polyester, used according to the present invention, can also comprise aliphatic dicarboxylic acid moieties. It may comprise saturated aliphatic dicarboxylic acid moieties derived from, e.g., succinic acid, glutaric acid, adipic acid, sebacic acid, etc. and/or unsaturated aliphatic carboxylic acid moieties derived from, e.g., maleic acid, fumaric acid, etc.

The polyester can be linear or branched. To produce a branched polyester either polycarboxylic acids as, e.g. trimellitic acid, trimesinic acid, pyromellitic acid, etc. or polyhydroxy compounds, as, e.g., trimethylolpropane, glycerol, pentaerythritol, etc. can be used.

In the polyester, useful in a reaction according to the present invention, diols used to condensate with the di-or polycarboxylic acids, can be either aliphatic or aromatic. Examples of alkylene diol moieties are moieties of ethylene glycol, diethylene glycol, 1,3-propanediol, 1,4-butanediol, 2-methyl-1,5-pentanediol, neopentylglycol, 1,4-cyclohexanedimethanol.

Aromatic diols, useful in a polyester to be used according to this invention are hydroquinone, bisphenol A, ethoxylated bisphenol A, propoxylated bisphenol A, p-xylene glycol, etc.

Also mixtures of aliphatic and aromatic diols can be used in a polyester for use according to the present invention.

Polyester derivatives (modified by other moieties than polysiloxane moieties) can be used to produce the polysiloxane modified resins according to the present invention. Such polyester are disclosed in WO 93/20129 and can also successfully be used to produce a polysiloxane modified resin according to the present invention.

When using polyester derivatives, to produce the polysiloxane modified resins according to the present invention, also polyesters that carry in the side-chain(s) crystalline polymers may be used. Such polyester derivatives have been described in European Application 94203323.4 filed on November 15, 1994, which is incorporated herein by reference.

Other very useful and preferred polymers in the reaction with epoxy terminated polysiloxane, according to the present invention, are vinyl type addition polymers having a Tg>40° C. and possessing in their structure said acidic and/or hydroxyl groups introduced by (random) copolymerization or graft-copolymerization, e.g. copolymers of lower alkyl esters of acrylic acid and/or styrene with unsaturated acids such as acrylic acid, methacrylic acid, maleic acid and itaconic acid or with hydroxyethylmethacrylate. Also addition polymers comprising terminal free carboxylic acid groups are very useful polymers for the preparation of polysiloxane modified resins according to the present invention.

The (co)polymers useful, according to the present invention, for the reaction with the epoxy groups comprised in the polysiloxane are preferably (co)polymers having an acid value (AV) and/or an hydroxyl value (HV) between 2 and 50 mg KOH per g of polymer, more preferably between 5 and 40 mg KOH per g of (co)polymer.

Particularly useful and the most preferred resins, both addition and polycondensation polymers, comprising carboxyl or hydroxyl groups, or both, are listed in the following Table 1. Of these resins the glass transition temperature Tg in °C. is given together with their number-average molecular weight (Mn) and weight-average molecular weight (Mw). The mentioned Mn and Mw values have to be multiplied by $10^3$. The resins containing free carboxylic acid groups and or hydroxyl groups are characterized by their total acid value (AV) or Hydroxyl value (HV) both expressed in mg KOH per g resin.

TABLE 1

| Chemical structure | AV | HV | Tg | Mn | Mw |
|---|---|---|---|---|---|
| Polyester resin of terephthalic acid, ethyleneglycol and DIANOL 22 | 3 | 31.1 | 62 | 3.6 | 10 |
| Polyester resin of fumaric acid and DIANOL 33 | 17 | 5.2 | 55 | 4.4 | 12 |
| Polyester resin of terephthalic acid, isophthalic acid and DIANOL 22 and ethyleneglycol | 18 | 20.9 | 60 | 4 | 18 |
| Copoly(styrene-butylacrylate-butylmethacrylate-stearylmethacrylate-methacrylic acid) (65/5/21/5/4) | 12 | 0 | 58 | 6 | 108 |
| Copoly(styrene-butylmethacrylate-acrylic acid) (80/15/5) | 5 | 0 | 63 | 5.5 | 180 |
| Polyester resin of DIANOL 33/DIANOL 22, terephthalic acid and trimellitic acid | 30 | 50 | 65 | 2.0 | 14 |
| Co(Styrene/n-butylmethacrylate), diCOOH terminated (65/35) | 15 | 0 | 48 | 2.1 | 10 |

DIANOL 22 is a trade name of AKZO CHEMIE of the Netherlands for bis-ethoxylated 2,2-bis(4-hydroxyphenyl)propane.

DIANOL 33 is a trade name of AKZO CHEMIE of the Netherlands for bis-propoxylated 2,2-bis(4-hydroxyphenyl)propane.

It has been found that the formation of polysiloxane modified resins, both polycondensation copolymers and addition polymers, useful in toner particles according to the present invention, could proceed at reaction temperatures of at most 200° C. (thus diminishing the risks of decomposition of the polysiloxane), when polysiloxane modified resins are made wherein the polysiloxane (PS) is attached to the other moieties (POL) of said modified resins over an ether group or an ester group. Hereinafter "polysiloxane modified resin" means block copolymers as well as graft copolymers as well as cross-linked copolymers.

The reaction of epoxy terminated polysiloxane derivatives with (co)polymers comprising carboxyl and/or hydroxyl groups, preferably with (co)polymers comprising carboxyl groups, is a simple, well controllable, relatively fast, chemical reaction, needing no organic solvent and not needing complex dosing of reaction ingredients during the reaction period.

The chemical reaction basically proceeds between the carboxyl and/or hydroxyl groups comprised in the (co) polymer and the epoxy groups terminating the polysiloxane.

As described above, the polysiloxanes, used according to the present invention, can be bi-functional, i.e. carrying two terminal epoxy-groups or mono-functional, i.e. carrying only one terminal epoxy group.

The formation of polysiloxane modified resins according to the present invention by the reaction between polysiloxane compounds, comprising an epoxy group and (co) polymers, comprising free carboxylic acid groups (either terminal or in side chains) proceeds at relatively low temperatures and goes to completion after a relatively short reaction time. Typical reaction times are between 30 and 300 minutes at temperatures between 150° and 200 ° C. This is especially so when the polysiloxane compounds have a polymerization degree of at most 20. With polysiloxane compounds showing a higher degree of polymerization, the reaction speed is decreased and more time is needed to get the reaction to completion. When the reaction is not completed, the polysiloxane modified resins can easily be purified by a simple extraction of the unreacted polysiloxane compounds in a suitable solvent, e.g. hexane.

The synthesis of the polysiloxane modified resins, useful for incorporation in toner particles according to the invention, can proceed in two different ways:

1. A polymer, comprising carboxyl and/or hydroxyl groups either terminal or within the polymer side chain, is mixed with at least one epoxy terminated polysiloxane. The epoxy group(s) react with the carboxyl or hydroxyl groups present in the host polymer and a polysiloxane modified resin is formed.

The method comprises the steps of (i) mixing a polymer, comprising carboxyl and/or hydroxyl groups either terminal or within the polymer chain with at least one bis- or mono-epoxy terminated polysiloxane, in a reaction vessel, (ii) heating said mixture, under nitrogen atmosphere, to a temperature between 150° C. and 200° C. under stirring, (iii) continuing said heating until the desired visco-elasticity is reached and (iv) cooling and recovering the polysiloxane modified resin.

The molten polymers are not miscible and form two distinct phases in the melt. The chemical reaction proceeds at the interface. After the formation of a few molecules of the polysiloxane modified resin, said acts as a kind of emulsifying agent for the reactants, and the reaction proceeds faster.

The reaction time is between 30 and 300 minutes depending on the reaction temperature.

After cooling of the reaction mixture the pure polysiloxane modified resin is obtained. There is no further need of purifying the reaction product, nor are there organic solvents that have to be recovered.

2. An other method for preparing the polysiloxane-modified resins according to the present invention is a single step polycondensation reaction. The epoxy terminated polysiloxane is mixed in the polycondensation mixture (di- or polycarboxylic acids, diols or polyols, eventually diamines or lactams) for forming the polyester and is thus copolycondensed in said polyester. This method comprises the steps of (i) mixing at least one epoxy terminated polysiloxane with at least one dicarboxylic acid or a lower alkyl ester thereof, at least one diol, optionally diamines or lactams or mixtures thereof to form a reaction mixture, (ii) heating said reaction mixture, optionally in the presence of proper catalysts, (iii) further heating the reaction mixture, if desired after addition of a polyol and/or a polycarboxylic acid in the polycondensation mixture, until the desired visco-elasticity is reached and (iv) cooling the reaction mixture and recovering the pure polysiloxane modified resin.

In a specific example of the method above, the polycondensation is carried out in two steps. In a first step (step (ii) above), a low molecular weight prepolymer is formed by the direct polycondensation of the di- or polycarboxylic acids, the di- or polyols (preferably in this step only dicarboxylic acids and diols are used), optionally a diamine or lactam, and the polysiloxane, carrying at least one epoxy group, present in the reaction mixture. The reaction is carried out at elevated temperature (150° to 200° C.), optionally in the presence of proper catalysts, e.g. dibutyltindioxide, dibutyltindilaurate, zincoxide, stannous oxide as are described in EP-A 234 899.

In a second step (step (iii) above), the prepolymer is further reacted at a temperature of between 150° and 200° C., if necessary under vacuum, optionally after the addition of a polyol and/or a polycarboxylic acid, until the desired visco-elasticity is reached (in this step preferably polyols or polycarboxylic acids are used).

After cooling of the reaction mixture the pure polysiloxane modified resin is obtained. There is no further need of purifying the reaction product, nor are there organic solvents that have to be recovered.

In both methods it is possible to control the viscoelastic properties (melt viscosity) of the polysiloxane modified resin that is formed by the adjustment of the reaction parameters, e.g. mechanical stirring, stirring by nitrogen bubbling, reaction under reduced pressure, reaction time and temperature, etc.

Polysiloxane modified resins, as described above, are not only useful for incorporation in toner particles, but can also favourably be used in a coated layer on a final substrate, especially a toner receiving layer on a transparent or opaque polymeric support, offering, especially in hot-pressure fixing systems, a very low adhesion to the hot-fixing roller. Said coated layer can be used to receive toner particles comprising a polysiloxane modified resin, according to the present invention, as toner resin as well as toner particles comprising other toner resins.

Polysiloxane modified resins, as defined in the present invention, can also favourably be used in a topcoat (outermost layer) on a final image present on a sheet or web material wherein the image can be made by any imaging means, e.g., electro(stato)graphic means, photographic means, printing means, etc. In that case a polysiloxane modified resin as defined in the present invention, can be applied by depositing a colourless toner composition comprising said polysiloxane modified resin or by coating a solution, comprising said polysiloxane modified resin, on top of said image (both on monochrome and multicolor images). This makes it possible to have a final print exhibiting high adhesive characteristics, which when the final image is conserved in e.g. plastic folders, is a desirable feature.

Polysiloxane modified resins, as defined in the present invention can also be used to form a protective coating on sheet or web materials either alone or in admixture with other polymers.

Polysiloxane modified resins, as defined in the present invention, can also favourably be used as ingredient in protective layers coated on X-ray intensifying screens and storage phosphor screens.

Said polysiloxane modified resins are also very useful in thermosublimation transfer imaging materials, both in the dye donor sheet and in the acceptor sheet, due to the adhesive properties of said resins.

The water repellency of said polysiloxane modified resins can be adjusted by changing the amount of polysiloxane moieties that are incorporated in the resin. It is preferred to add at least 5% by weight of polysiloxane moieties, preferably more than 7.5% by weight.

EXAMPLES

The glass transition temperature (Tg) mentioned in the examples was determined according to ASTM Designation: D 3418-82. The Tg mentioned in the examples is the Tg of the non-polysiloxane moieties (the other polymeric moieties, POL) of the polysiloxane modified resin.

All viscosities mentioned in the examples were measured with a RHEOMETRICS dynamic rheometer, RVEM-200 (One Possumtown Road, Piscataway, N.J. 08854 U.S.A.).

The percentage of polysiloxane incorporated in the polysiloxane modified resin was determined gravimetrically. 5 g of the polysiloxane modified resin were crushed to a powder having particle sizes between 250 and 750 μm and stirred for 24 hours at room temperature in 50 ml hexane. The free polysiloxane was dissolved in the hexane and the polysiloxane modified resin not. After filtration, washing with hexane and drying, the weight of the undissolved powder of the polysiloxane modified resin was determined. From the difference in weight of the undissolved powder and the weight of the powder before the hexane treatment the % by weight of the incorporated polysiloxane was determined.

All parts and percentages are by weight unless stated differently.

Sybthesis Example 1

(SIPOL1)

95 g of ATLAC T500 (which is a trade name of Atlas Chemical Industries Inc. Wilmington, Del. U.S.A. for a linear polyester of fumaric acid and propoxylated bisphenol A, having a Tg of about 55° C., and an acid value of 17 mg KOH/g polyester) were mixed with 5 g of TEGOMER E-Si-2130, (tradename of Th. Goldschmid AG, Essen, Germany) for a bis-epoxy-terminated polydimethylsiloxane with formula:

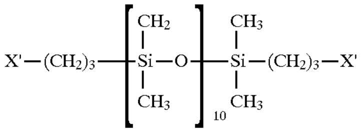

wherein X' is

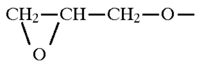

This mixture was molten in a glass reaction vessel under $N_2$ atmosphere and with nitrogen bubbling through the reaction mixture. The mixture was heated to 200° C. After 60 minutes the reaction was stopped and the polysiloxane modified resin was recovered. The cooled mass was crushed and the properties of the polysiloxane modified resin were determined. These properties are reported in table 2.

Synthesis Example 2

(SIPOL2)

The procedure of synthesis example 1 was repeated, but instead of 60 minutes reaction time, the reaction was continued for 120 minutes. The properties of the resulting polysiloxane modified resin are reported in table 2.

SYNTHESIS EXAMPLE 3

(SIPOL3)

The procedure of synthesis example 1 was repeated, but instead of 60 minutes reaction time, the reaction was continued for 120 minutes and the reaction mixture was stirred mechanically instead of by the bubbling of nitrogen gas. The properties of the resulting polysiloxane modified resin are reported in table 2.

Synthesis Example 4

(SIPOL4)

The procedure of synthesis example 3 was repeated, but instead of 120 minutes reaction time, the reaction was continued for 240 minutes. The properties of the resulting polysiloxane modified resin are reported in table 2.

Synthesis Example 5

(SIPOL5)

The procedure of synthesis example 3 was repeated, but instead of 95 g, 90 g of ATLAC T500 (tradename) was used and instead of 5 g, 10 g of TEGOMER E-Si-2130 (tradename) was used. The properties of the resulting polysiloxane modified resin are reported in table 2.

Synthesis Example 6

(SIPOL6)

The procedure of synthesis example 1 was repeated, but instead of 95 g, 85 g of ATLAC T500 (tradename) was used and instead of 5 g, 15 g of TEGOMER E-Si-2130 (tradename) was used. The reaction took place under reduced pressure, instead of under nitrogen atmosphere and the reaction mixture was stirred mechanically. The properties of the resulting polysiloxane modified resin are reported in table 2.

Synthesis Example 7

(SIPOL7)

The procedure of synthesis example 1 was repeated, but instead of the 5 g of polysiloxane E-Si-2130 (trade name), 5 g of polysiloxane E-Si-2330 (trade name of Th. Goldschmid AG, Essen, Germany for a bis-epoxy-terminated polydimethylsiloxane with formula:

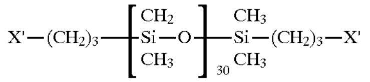

VI wherein X' is

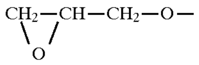

were used. The reaction proceeded for 120 minutes at 200° C. under mechanical stirring and reduced pressure. The properties of the resulting polysiloxane modified resin are reported in table 2.

Synthesis Example 8

(SIPOL8)

The procedure of synthesis example 1 was repeated, but instead of 5 g of a bis-epoxy-terminated polysiloxane, 5 g of a monoepoxysiloxane with formula:

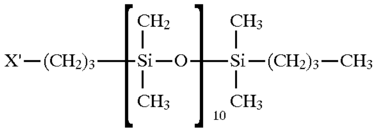

VII wherein X' is

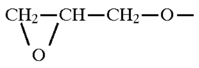

was used. The reaction proceeded for 90 minutes at 200° C. under stirring by nitrogen bubbling through the reaction mixture. The properties of the resulting polysiloxane modified resin are reported in table 2.

Synthesis Example 9

(SIPOL9)

The synthesis of synthesis example 8 was repeated, but the reaction ran under reduced pressure for 120 minutes, with mechanical stirring. The properties of the resulting polysiloxane modified resin are reported in table 2.

Synthesis Example 10

(SIPOL10)

The procedure of synthesis example 1 was repeated, but instead of ATLAC T500 (tradename), a branched copolyester of 0.42 mol terephthalic acid, 0.28 mol trimellitic acid, 0.30 mol of bis-ethoxylated ethoxylated bisphenol A and 0.70 mol of bis-propoxylated bisphenol A was used. This polymer had a Tg of 65° C. and an acid value of 30 mg KOH/g polymer. The reaction with the polysiloxane, TEGOMER E-Si-2130 (tradename), was carried out at 200° C. for 90 minutes. The properties of the resulting polysiloxane modified resin are reported in table 2.

Synthesis Example 11

(SIPOL11)

The procedure of synthesis example 1 was repeated, but instead of ATLAC T500 (tradename), a bis-carboxyl-terminated addition polymer of 65% by weight of styrene and 35% by weight of n-butylmethacrylate was used. This polymer had a Tg of 48° C. and an acid value of 16 mg KOH/g polymer. The reaction with the polysiloxane, TEGOMER E-Si-2130 (tradename), was carried out at 200° C. for 120 minutes. The properties of the resulting polysiloxane modified resin (block copolymer) are reported in table 2.

Synthesis Example 12

(SIPOL12)

34.4 g of DIANOL 33 (trade name of AKZO CHEMIE of the Netherlands for a bis-propoxylated 2,2-bis(4-hydroxyphenyl)propane), 10.79 g of maleic acid anhydride and 4.34 g of polysiloxane E-Si-2130 were mixed and stirred under nitrogen atmosphere for 60 minutes at 185° C. Then 50 mg of p-methoxyphenol was added as a thermal inhibitor, and the reaction mixture was further heated for 60 minutes at 200° C. This mixture was polycondensed under stirring and vacuum of less than 1 hPa. The polycondensation took 3 hours at 200° C. After cooling the polymer was recovered. The properties of the resulting polysiloxane modified resin (block copolymer) are reported in table 2.

TABLE 2

| Polymer | PS added* | Tg(°C.)†† | Meltvisco** | PS incorporated† |
|---|---|---|---|---|
| SIPOL1 | 5 | 52.5 | 270 | >95 |
| SIPOL2 | 5 | 55.8 | 790 | >95 |
| SIPOL3 | 5 | 51.4 | 245 | >95 |
| SIPOL4 | 5 | 53.1 | 406 | >95 |
| SIPOL5 | 10 | 45 | 287 | >95 |
| SIPOL6 | 15 | 42 | 472 | >95 |
| SIPOL7 | 5 | 57.5 | 463 | 50 |
| SIPOL8 | 5 | 56.5 | 306 | 55 |
| SIPOL9 | 5 | 56.5 | 930 | >95 |
| SIPOL10 | 5 | n.m. | 296 | >95 |
| SIPOL11 | 5 | 51 | 308 | >95 |
| SIPOL12 | 10 | 42 | 96*** | >95 |

*polysiloxane added to the reaction mixture in % by weight
**in Pas, measured at 120° C.
***in Pas, measured at 115° C.
†is a measure of the completion of the reaction, gives the % of the added polysiloxane that has reacted.
††is the Tg of the non-polysiloxane moieties of the polysiloxane modified resin.
n.m. is not measured

EXAMPLES OF WATER REPELLENT LAYERS

Different polysiloxane modified resins were prepared according to synthesis example 1, but with different contents of polysiloxane compounds (the amounts of polysiloxane added are reported in table 3), under reduced pressure and with mechanical stirring. The resins were dissolved in methyl-ethylketone and coated on an unsubbed polyethyleneterephthalate support (PET) of 100 μm thickness by means of a bar coating machine. The dry layers were 10 μm thick. As comparative example, a layer of non modified linear polyester (ATLAC, 500 trade name) was coated. The coatings were attached to a tiltable, a drop of water was applied to each of the coatings. The tiltable table was gradually tilted and the angle under which the drop started to flow was measured (tilt angle). A smaller angle is an indication of higher water repellency. The results are reported inn table 3.

TABLE 3

| Number | % polysiloxane* added | Tg in °C.** | Angle in degree |
|---|---|---|---|
| 1 | 2 | 58.3 | 38 |
| 2 | 5 | 53.8 | 30 |
| 3 | 10 | 46.3 | 14 |
| 4 | 15 | 42 | 8 |
| ATLAC T500 (comparison) | 0 | 55 | 40 |

*in weight
**is the Tg of the non-polysiloxane moieties of the polysiloxane modified resin.

It is clear that optimum results are obtained when at least 5% of polysiloxane is added. When it is desired to keep the Tg of the resulting resin above 40° C., the addition of 15% of polysiloxane moieties, seems, in combination with ATLAC T500 (trade name), being a maximum. With polymers having higher Tg than ATLAC T500 (trade name), it is possible to incorporate more polysiloxane moieties, before the Tg is lowered under 40° C.

TONER EXAMPLES

Three different toners were prepared

COMPARATIVE TONER (CT): 97 parts by weight of ATLAC T500 (trade name) ATLAC is a linear polyester of fumaric acid and propoxylated bisphenol A, having a Tg of about 55° C., and an acid value of 17 mg KOH/g polyester and 3 parts by weight of HELIOGEN BLAU (tradename of BASF, Germany for Cu-phthalocyanine) were intimately mixed together, placed in a melt kneader and heated to 120° C. to form a melt. This melt was melt kneaded for 20 minutes. Thereafter the mixture was allowed to cool to room temperature (20° C.). At that temperature the mass was crushed and classified to give toner particles with average particle size of 8.5 μm based on volume, and with average particles size of 6.5 μm based on number, when measured with a COULTER COUNTER (registered trade mark) Model TA II particle size analyzer operating according to the principles of electrolyte displacement in narrow aperture and marketed by COULTER ELECTRONICS Corp. Northwell Drive, Luton, Bedfordshire, LC 33, UK.

INVENTION TONER 1 (IT1): The procedure for the preparation of the comparative toner was repeated but instead of 97 parts of ATLAC T500, 97 parts of SIPOL4 (prepared according to synthesis example 4) were used. The average volume diameter was 8.7 μm.

INVENTION TONER 2 (IT2): The procedure for the preparation of the comparative toner was repeated but instead of 97 parts of ATLAC T500, 97 parts of SIPOL6 (prepared according to synthesis example 6) were used. The average volume diameter was 8.6 μm.

With these toners three different developers were prepared:

COMPARATIVE DEVELOPER (CD) with comparative toner CT

INVENTION DEVELOPER (ID1) with invention toner IT1

INVENTION DEVELOPER (ID2) with invention toner IT2.

All three developers were made by mixing 5% of toner particles with coated ferrite carrier particles having an average volume diameter of 60 μm and a magnetization of 60 emu/g. The toner particles were used as such, i.e. without the addition of any flow improving additive.

The three developers were used to develop an image on a reflecting support in a configuration where NO cleaning potential was applied to the photoconductive member. The images were fused for 10 minutes at 120° C.

The background density in the images with the three developers was measured in reflection mode by means of a Macbeth TR-1224 optical densitometer. The values are reported in table 4.

TABLE 4

| Developer | Background Density |
|---|---|
| CD | 0.16 |
| ID1 | 0.05 |
| ID2 | 0.00 |

It is clear that the background density is much lower when toner particles comprising polysiloxane moieties according to the present invention are used.

We claim:

1. An image receptor sheet or web material comprising a polymeric support and a toner layer thereon, including a polymeric binder, wherein said polymeric binder contains at least 50% by weight, with respect to the total amount of said binder, of one or more polysiloxane modified resins comprising polymeric moieties POL and polysiloxane moieties PS and selected from the group consisting of polyesters having an acid value between 2 and 50 mg KOH/g of polymer, polyesters having a hydroxyl value between 2 and 50 mg KOH/g of polymer, addition polymers having an acid value between 2 and 50 mg KOH/g of polymer and containing styrene moieties, addition polymers having a hydroxyl value between 2 and 50 mg KOH/g of polymer and containing styrene moieties, addition polymers having an acid value between 2 and 50 mg KOH/g of polymer and containing alkylacrylate moieties and addition polymers having a hydroxyl value between 2 and 50 mg KOH/g of polymer and containing alkylacrylate moieties and an epoxy-terminated polysiloxane PS forming a modified polymer with recurring units corresponding to one of formulas I to IV:

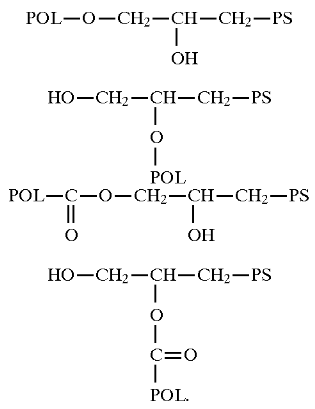

I

II

III

IV

2. A sheet or web material according to claim 1, wherein said epoxy-terminated polysiloxane correspond to the formula VI:

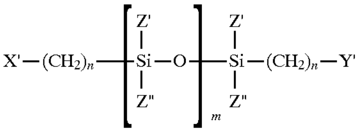 VI wherein:

X' corresponds to

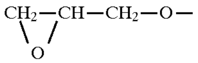

Y' has the same meaning as X or represents a C1 to C4 alkyl group,

Z' and Z" are equal or different and represent a C1 to C4 alkyl group or an aryl group, 2≦m≦35 and 1≦n≦6.

3. A sheet or web material according to claim 2, wherein Z'=Z"=$CH_3$ or $C_2H_5$, 5≦m≦30 and 2≦n≦4.

4. A sheet or web material according to claim 2, wherein said Z'=Z"=$CH_3$, m=10 and n=3.

5. A sheet or web material according to claim 1, wherein said polymer is selected from the group consisting of:

i) a polyester resin of terephthalic acid, ethylene glycol and bisethoxylated 2,2-bis(4-hydroxyphenyl)propane, ii) a polyester resin of fumaric acid and bis-propoxylated 2,2-bis(4-hydroxyphenyl)propane, iii) a polyester resin of terephthalic acid, isophthalic acid, ethylene glycol and bis-ethoxylated 2,2-bis(4-hydroxyphenyl)propane, iv) a polyester resin of terephthalic acid, trimellitic acid, bisethoxylated 2,2-bis(4-hydroxyphenyl)propane and bis-propoxylated 2,2-bis(4-hydroxyphenyl)propane, v) copoly(styrene-butylacrylate-butylmethacrylate-stearylmethacrylate methacrylic acid) (65/5/21/5/4) and vi) copoly(styrene-butylmethacrylate-acrylic acid) (80/15/5).

* * * * *